US010425259B2

United States Patent
Rinne (10) Patent No.: US 10,425,259 B2
(45) Date of Patent: Sep. 24, 2019

(54) NON-ORTHOGONAL COVER CODES FOR CO-CHANNEL NETWORK ISOLATION

(71) Applicant: Nokia Technologies Oy, Espoo (FI)

(72) Inventor: Mika Rinne, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/557,356

(22) PCT Filed: Feb. 9, 2016

(86) PCT No.: PCT/IB2016/050680
§ 371 (c)(1),
(2) Date: Sep. 11, 2017

(87) PCT Pub. No.: WO2016/147062
PCT Pub. Date: Sep. 22, 2016

(65) Prior Publication Data
US 2018/0054333 A1    Feb. 22, 2018

Related U.S. Application Data (60) Provisional application No. 62/133,139, filed on Mar. 13, 2015.

(51) Int. Cl.
*H04L 5/00* (2006.01)
*H04L 25/03* (2006.01)
(Continued)

(52) U.S. Cl.
CPC ....... *H04L 25/03866* (2013.01); *H04B 1/707* (2013.01); *H04L 5/0019* (2013.01);
(Continued)

(58) Field of Classification Search
CPC ............ H04L 25/03866; H04L 5/0048; H04L 5/0019; H04L 5/0094; H04B 1/707; H04W 48/12
See application file for complete search history.

(56) References Cited

U.S. PATENT DOCUMENTS 7,054,296 B1    5/2006  Sorrells et al.
8,427,936 B2 *  4/2013  Walton .................. H04B 1/692
                                                    370/206
(Continued)

FOREIGN PATENT DOCUMENTS

WO    2012/071721 A1    6/2012

OTHER PUBLICATIONS

"News and Events", MulteFire, Retrieved on Jul. 3, 2017, Webpage available at : https://www.multefire.org/news-and-events/.
(Continued)

*Primary Examiner* — Phuc H Tran
(74) *Attorney, Agent, or Firm* — Squire Patton Boggs (US) LLP (57) ABSTRACT

Various communication systems may benefit from identification of devices or systems using a channel. For example, certain communication systems may benefit from non-orthogonal cover code for co-channel network isolation. A method can include deciding a cover code index. The method can also include signaling the cover code index to a user equipment. The cover code index can correspond to a non-orthogonal cover code that is created in a network-specific manner.

17 Claims, 8 Drawing Sheets

(51) Int. Cl.
*H04W 48/12* (2009.01)
*H04B 1/707* (2011.01)

(52) U.S. Cl.
CPC .......... *H04L 5/0048* (2013.01); *H04L 5/0094* (2013.01); *H04W 48/12* (2013.01)

(56) References Cited

U.S. PATENT DOCUMENTS

| | | | | |
|---|---|---|---|---|
| RE46,406 E | * | 5/2017 | Hooli | H04J 11/00 |
| 9,642,119 B2 | * | 5/2017 | Pajukoski | H04L 5/0048 |
| 2007/0053280 A1 | * | 3/2007 | Uesugi | H04L 5/026 |
| | | | | 370/208 |
| 2012/0231760 A1 | * | 9/2012 | Zhu | H04W 4/90 |
| | | | | 455/404.1 |
| 2013/0034064 A1 | | 2/2013 | Nam et al. | |
| 2013/0204999 A1 | * | 8/2013 | Lindberg | H04L 41/142 |
| | | | | 709/223 |
| 2013/0324134 A1 | * | 12/2013 | Ruparelia | H04L 51/38 |
| | | | | 455/445 |
| 2013/0343316 A1 | * | 12/2013 | Pajukoski | H04L 5/0048 |
| | | | | 370/329 |
| 2014/0161157 A1 | * | 6/2014 | Balraj | H04B 1/711 |
| | | | | 375/148 |
| 2014/0204853 A1 | | 7/2014 | Ko et al. | |
| 2014/0233407 A1 | | 8/2014 | Pourahmadi et al. | |
| 2017/0019937 A1 | * | 1/2017 | Kim | H04W 8/26 |
| 2017/0251517 A1 | * | 8/2017 | Kimura | H04W 72/044 |

OTHER PUBLICATIONS

"3rd Generation Partnership Project; Technical Specification Group Radio Access Network; Evolved Universal Terrestrial Radio Access (E-UTRA); Physical channels and modulation(Release 12)", 3GPP TS 36.211, V12.3.0, Sep. 2014, pp. 1-124.

International Search Report and Written Opinion received for corresponding Patent Cooperation Treaty Application No. PCT/IB2016/050680, dated Jun. 8, 2016, 12 pages.

Extended European Search Report corresponding to Appln. No. 16 76 4299, dated Sep. 10, 2018.

* cited by examiner

NON-ORTHOGONAL COVER CODES FOR CO-CHANNEL NETWORK ISOLATION

RELATED APPLICATION

This application was originally filed as Patent Cooperation Treaty Application No. PCT/IB2016/050680 filed Feb. 9, 2016 which claims priority benefit to U.S. Provisional Patent Application No. 62/133,139, filed Mar. 13, 2015.

BACKGROUND

Field

Various communication systems may benefit from identification of devices or systems using a channel. For example, certain communication systems may benefit from non-orthogonal cover code for co-channel network isolation.

Description of the Related Art

Licensed Assisted Access (LAA), in connection with the third generation partnership project (3GPP) Release-13, studies a carrier aggregation scheme, where long term evolution (LTE)/LTE Advanced (LTEA) operates having secondary cells or secondary component carriers on the unlicensed band(s). In the first phase, there may be downlink Scells in the unlicensed band, while in the next phase uplink Scells may also be configured to operate in the unlicensed band. It is also thinkable that LAA operation in the unlicensed band is not a carrier aggregation scheme but downlink and uplink LAA transmissions are stand-alone cells, instead of being Scells. The unlicensed band, for example at 5 GHz, may be available for LAA. Also other unlicensed spectrum may be usable for the LAA transmissions. LTE/LTEA may have changes in its Scell definition for the LAA operation.

In LTE/LTEA operations in the licensed band, different networks transmit in different (exclusive, licensed) carrier frequencies, and if there are transmissions in the same carrier frequency, these transmissions are of the same network. This is due to the administrated allocation of frequencies with an exclusive license. Hence, in LTE/LTEA operations in the unlicensed band, there is conventionally no coordination between different networks, however in unlicensed band two or more networks could have their carriers transmitted in the same frequency channel in the same area. LTE/LTEA signals are designed to provide sufficient isolation between all transmissions of the same network, for example between transmissions from neighboring transmission points or between transmissions of UEs in different cells. However, there is no signal isolation defined between transmissions of different networks, because different networks actually use the same set of signals specified for LTE/LTEA, in general. Hence, even if there are randomizations present, it may happen that two networks end up using exactly the same set of randomizations occasionally in the same or close-by area. It may be difficult for the UE to operate under these conditions. The signal detection, synchronization, channel estimation, demodulation and decoding, interference cancellation, and the like receiver algorithms may fail, or may have a high risk of failing.

SUMMARY

According to a first embodiment, a method can include deciding a cover code index. The method can also include signaling the cover code index to a user equipment. The cover code index can correspond to a non-orthogonal cover code that is created in a network-specific manner.

In a variant, the non-orthogonal cover code can be created as a long, pseudo-random scrambling sequence.

In a variant, a length of the scrambling sequence can be over all symbols over full bandwidth for a period of one frame.

In a variant, the cover code can be created in a network in the network-specific manner.

In a variant, the cover code index can be created using a seed of a mobile network code of a public land mobile network identifier.

In a variant, the cover code index can be created using a seed of a mobile network code in combination with a mobile country code.

In a variant, the method can further include scrambling, by the cover code, at least one data channel.

In a variant, the method can be performed by a network element.

In variants, the network element can be an evolved node B, a licensed assisted access transmission point, a remote head or an access point or a home node. Also, hotspot transmitters and other distributed transmitters are feasible.

According to a second embodiment, a method can include receiving a cover code index.

The cover code index can correspond to a non-orthogonal cover code that is created in a network-specific manner. The method can also include generating the cover code based on the cover code index.

In a variant, the method can also include detecting a synchronization sequence using the cover code.

In a variant, the method can further include detecting a reference signal sequence using the cover code.

In a variant, the method can additionally include signaling in an unlicensed band using the cover code in an uplink communication.

In a variant, the method can be performed by a user equipment.

According to third and fourth embodiments, an apparatus can include means for performing the method according to the first and second embodiments respectively, in any of their variants.

According to fifth and sixth embodiments, an apparatus can include at least one processor and at least one memory and computer program code. The at least one memory and the computer program code can be configured to, with the at least one processor, cause the apparatus at least to perform the method according to the first and second embodiments respectively, in any of their variants.

According to seventh and eighth embodiments, a computer program product may encode instructions for performing a process including the method according to the first and second embodiments respectively, in any of their variants.

According to ninth and tenth embodiments, a non-transitory computer readable medium may encode instructions that, when executed in hardware, perform a process including the method according to the first and second embodiments respectively, in any of their variants.

According to tenth and eleventh embodiments, a system may include at least one apparatus according to the third or fifth embodiments in communication with at least one apparatus according to the fourth or sixth embodiments, respectively in any of their variants.

BRIEF DESCRIPTION OF THE DRAWINGS

For proper understanding of the invention, reference should be made to the accompanying drawings, wherein:

FIG. 6 additionally teaches how to apply the cover code sequence on some resource elements or sets of resource elements, whereas signals on some other resource elements may not be subject to the multiplication by the cover code sequence.

DETAILED DESCRIPTION

Certain embodiments may provide network isolation by non-orthogonal cover codes. Certain embodiments can be applied to a Licensed Assisted Access (LAA) scheme, where multiple LTE/LTEA networks may operate with their secondary cells (Scell) or secondary component carriers in the unlicensed spectrum. There may be no coordination of Scell operations between different networks and hence the networks may choose to have their Scell component carriers on the same frequency channel in the same area.

LTE/LTEA can differentiate reference signals by the physical cell identity (PCI). PCI can be detected by the UE from a combination of a primary synchronization sequence (PSS) and a secondary synchronization sequence (SSS). The sequence separation, as indexed by the PCI, can provide sufficient isolation between the reference signal sequences of the neighboring LTE/LTEA cells in the same network. The mapping of reference signals to the symbol resources (resource elements) and the sequence selection based on PCI may be sufficient to isolate any synchronization signals or reference signals of one cell from the other cells.

PCI is a set that is standardized for the LTE/LAA network. Therefore, conventionally all LTE/LTEA networks use the same set of sequences for their PCIs. There is no problem in the legacy operation on the licensed band, because networks of different operators use different frequencies, as licensed by spectrum authorities to them.

In LAA, different networks may choose to operate in the same frequency channel and hence it is possible that two networks use the same PCI in a place where a UE can hear the cells (transmission points, or eNBs) from both of these networks. This may create challenges for the UE to detect the synchronization sequences and the reference sequences and to operate in an intended serving cell. It may even get impossible for the UE to keep the serving cell due to this other-network interference. In particular, this other-network interference may be badly correlated with the wanted signal.

Assume the two different networks are non-coordinated and hence asynchronous with arbitrary timing difference. Interference is bad if the same sequence comes from two sources to the same symbol interval, say [−0.9 Ts, 0.9 Ts] where Ts is the symbol duration. If having the same PCI i.e. the same sequences in use, the probability of partly harmful overlapping symbols is 1.8 Ts/(10 ms*14 Ts/1 ms)=1.3%. This means that in every 100 cells of having the same PCI, there is at least one (~1.3) cell, which has the problem described above. If having random PCI, the probability of colliding is $2.6*10^{-5}$ so that both the timing and the PCI sequence match badly. In a million small cells, there would be 25 cells where the problem appears. The above calculation is for the Common Reference Signal (CRS). The issue is more severe and much more difficult to avoid for the Dedicated Reference Signal (DRS) or a Demodulation reference Signal (DMRS).

For the synchronization sequences it holds that for 3 PSS there exist 168 SSS to identify the 504 PCIs. PSS cannot (and will not) be scrambled. Hence there are 1/168 colliding SSS (SSS-pairs in subframe 0 and subframe 5) between two different networks. The probability of colliding is $7.7*10^{-5}$ so that both the timing and the sequence match badly. In a million small cells, there would be 76 cells where the problem appears.

However, the calculation above is for a static Scell setting. When Scells are switching on/off and new transmission nodes activate/deactivate, the situation in time gets much worse than in the static calculations above. The use of Scells is not too static but may have cell on/off behavior for the sake of power saving and for reducing interference when there is no data to transmit, or for other reasons. When waking-up, a new PCI may need to be selected, because there is no memory for all the possible on/off behaving transmitters. According to certain embodiments, this PCI selection can be random with the help of cover code, as it allows avoiding the PCI-in-use detection in the spectrum before activating the transmissions. If neighboring PCIs need to be (every time) detected before generating own Scell transmission, it will delay the actual beginning of the Scell transmission.

It can be assumed that in a given area, the small cell transmissions appear from many independent sources. Hence, sometimes there can be a few transmitting Scell nodes in an area, whereas at other times there could be tens of (maybe a hundred of) transmitting Scell nodes. (Compare e.g. WLAN, where in a high dense area several tens of independent WLAN transmissions may be received by a device in a given location.

Regarding Time Division Duplex (TDD) networks operating on the same band, they may be synchronized which can aggravate the problem, namely collision can occur with higher probability compared to the situation of non-synchronized (asynchronous) networks. The (PCI) sequence collision for synced networks could be 0.2% for CRS and 0.6% for SSS. That is in every 1000 cells there would be colliding cells.

Cover code is a future proof solution, because it works for any transmission point density. It also works for any extension of Scell transmissions to any component carrier frequency as colliding sequences are always avoided. (Otherwise, without the cover code in use, PCI detection for any attempted component carrier would need to be done before its use.)

Certain embodiments, by contrast, can provide a way to isolate signals of different networks operating on the same spectrum. In certain embodiments, the non-orthogonal cover codes can be used for such signal isolation. According to certain embodiments, the non-orthogonal cover code can be created as a long (or a very long) scrambling sequence. The length of the scrambling sequence can be over all symbols (all resource element 'bins') over full bandwidth for the period of one frame or 10 ms. This sequence can be used to additionally multiply the critical sequences of the LAA network. The cover codes can be created in the network, in a network specific manner, and therefore the cover codes in different networks can be different. The cover codes can be non-orthogonal so that they work with any arbitrary time differences for the signals arriving to a UE from two or more transmission points of different networks. According to an embodiment, orthogonal cover codes may be in use. If orthogonal cover codes were used, such codes may lose their orthogonality when the time difference of the codes becomes arbitrary.

Figure 2:
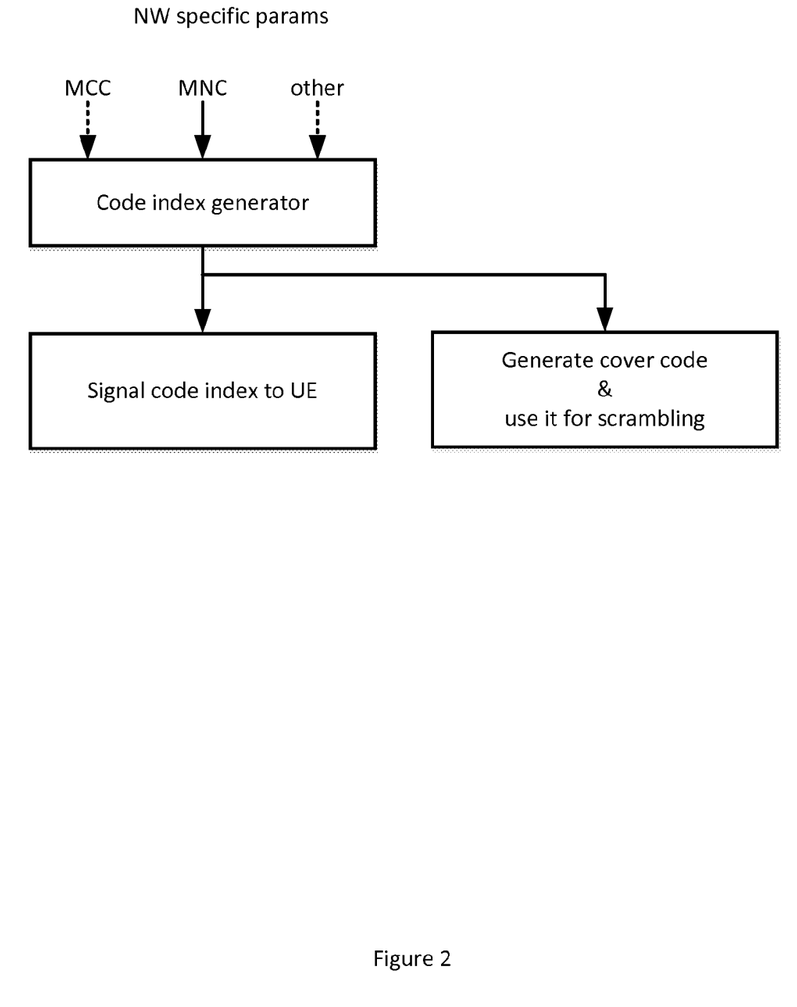
FIG. 2 illustrates an example of generation and use of a cover code sequence index, according to certain embodiments.

According to certain embodiments, the network creates the index of the non-orthogonal cover code e.g. from the Mobile Network Code (MNC) of its public land mobile network identifier (PLMNID). The use of such an index may guarantee that no two networks can accidentally choose the same cover code, because each MNC is administrated to be different. Each network can hence create a code without any communication or interface needed to the other networks, because the network can know or assume that other MNCs will be different (as being administrated identifiers). As an alternative, a combination of the mobile country code (MCC) and MNC can be used instead of the MNC alone. The generation of the code index is illustrated in FIG. 2.

One access network may serve multiple PLMNs. In such a case, the cover code can be selected based on the first listed PLMN-Identity in the PLMN-IdentityList, also known as the primary PLMN. This uniquely works for the serving UEs in the home network, the UEs roaming or UEs visiting the network, or the UEs served by any network sharing scheme. Anyway, the cover code index can be decided based on the primary PLMN and the UE need not know this. In case the PLMN or part of it directly allows the UE to index the cover code, it is available for the UE which decodes the PLMNID from the System Information. Furthermore, this methodology may not depend on any PLMN selection UE may have done to operate in the network, if the cover code index is signaled to the UE.

According to certain embodiments, the network can decide the cover code index and can signal the cover code index to the UE. The signaling can happen in an RRCConnectionReconfiguration in a licensed band Primary Cell (Pcell) according to LAA carrier aggregation. This signaling may be very reliable and robust and may be needed anyway when LAA carrier aggregation is configured. As the network can decide the cover code index, the signaling may only need to contain the index, and the UE can generate the sequence based on the index and e.g. based on the standardized description of the sequence.

This same, single, cover code can be used for any component carrier in any Scell operation over any frequencies in the unlicensed spectrum, because the cover code can isolate a particular network from any other. Also, this single cover code can be used for isolation of any of the sequences of a network, because the signals of a single network may already be separated as defined in the legacy LTE/LTEA signal structures, and the additional isolation may only need to be provided between different networks. The functionality and signaling according to certain embodiments are illustrated in FIG. 1.

Figure 1:
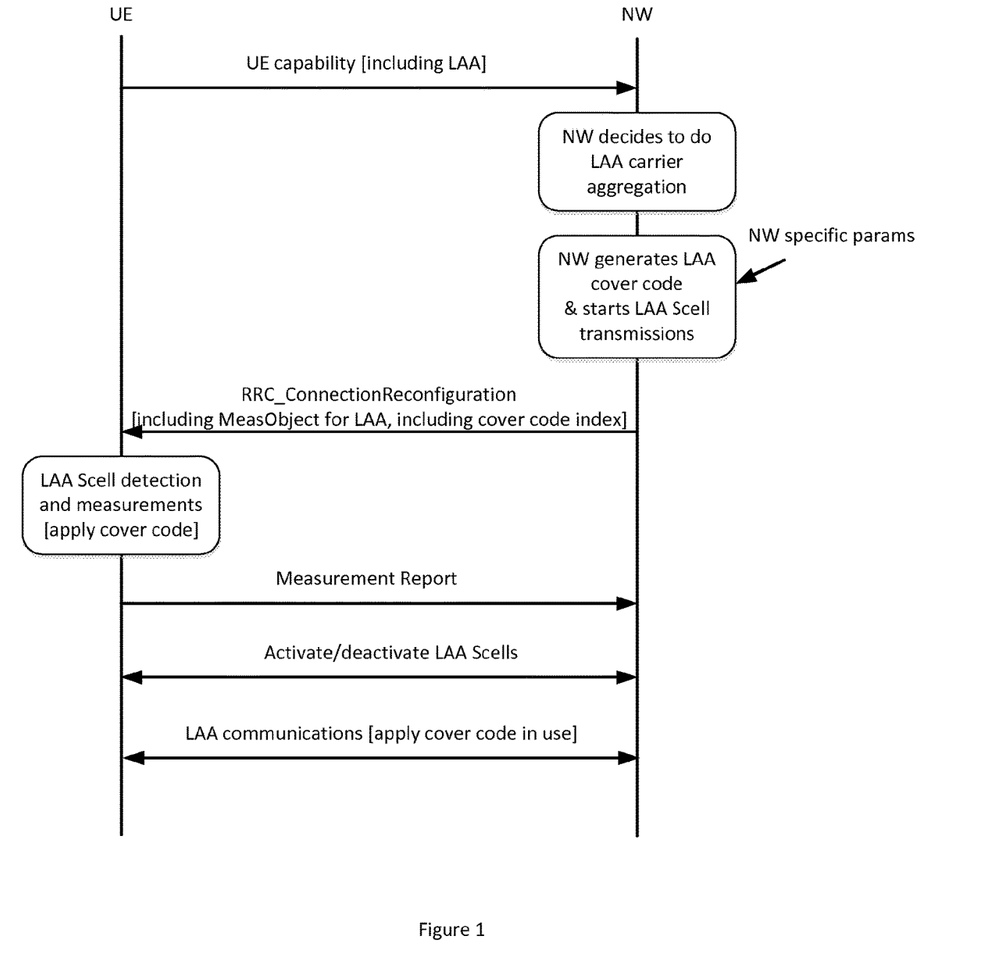
FIG. 1 illustrates a signaling diagram of a method and system according to certain embodiments.

Thus, FIG. 1 illustrates a signaling diagram of a method and system according to certain embodiments. More particularly, FIG. 1 illustrates creation of the LAA network specific cover code index and signaling the index to the UE.

As shown in FIG. 1, a user equipment (UE) can signal a UE capability to the network (NW). The UE capability information can include information regarding LAA. The NW can decide to do LAA carrier aggregation. Additionally, the NW can generate a LAA cover code and can start LAA Scell transmissions. NW specific parameters can be used in the generation of the LAA cover code.

The network can perform radio resource control (RRC) connection reconfiguration with the user equipment. The RRC connection reconfiguration can include a LAA Scell configuration including a cover code index. LAA Scell configuration may e.g. be used for defining the LAA measurement object.

Accordingly, the UE can perform LAA Scell detection and measurements. The UE can apply the cover code when performing detection and measurements, which can be done from the reference signals. Then, the UE can send a measurement report to the NW and the NW can activate or deactivate LAA Scells for the UE based on the measurement report, or based on any kind of channel quality or channel estimation or SINR estimation feedback to the NW.

Once the LAA Scells have been activated, LAA communications can occur. These LAA communications can apply the cover code in use. For example, the cover code during LAA communications can at least be used for handling of the reference signals for the channel estimation for data decoding.

FIG. 2 illustrates an example of generation and use of a cover code sequence index, according to certain embodiments. As shown in FIG. 2, a code index generator in the NW or elsewhere, can generate a code index based on various network specific parameters, optionally in combination with additional parameters. The parameters used can e.g. include at least one of MCC, MNC, and/or other parameters.

The NW can then signal the code index to the UE. In parallel, the NW can also use the code index to generate a cover code and use the cover code for scrambling transmission by the NW.

As an extension to certain embodiments, scrambling by the cover code can also be applied on data channels like the physical downlink shared channel (PDSCH) and physical downlink control channel (PDCCH).

Similar to the signal protection described for the downlink, signals in the uplink can be isolated too. This may be useful when UEs transmit in the unlicensed band. The signal isolation can be generated, for example, for the demodulation reference signals (DMRS), sounding reference signals (SRS), and the like uplink signals. Also the physical uplink control channel (PUCCH) and physical uplink shared channel (PUSCH) can be protected by the LAA network specific cover code.

The same network-specific cover code can be used in all transmission points, such as eNBs, and all UEs over all component carriers, including downlink as well as in uplink, for communications in the unlicensed band.

The cover code created and signaled to the UE according to certain embodiments can be used by the network and by the UE. The Reference Signals, e g at least one of the Cell-specific Reference Signals also known as the Common Reference Signal (CRS), the UE specific Reference Signals also known as the Dedicated Reference Signal (DRS) or a Demodulation Reference Signal (DMRS) or the Channel State Information Reference Signal (CSI-RS), or a discovery signal would be scrambled by the cover code, in addition to their genuine pseudo-noise scrambling sequences in use (in the legacy single-network transmission already). The user-specific, dedicated reference signals can all be multiplied by the same cover code and there is no need to separate different UEs by the cover code, because the user-specific separation is already done by the user-specific, dedicated pseudo-noise sequence.

The synchronization sequences can be isolated between different LAA networks. According to certain embodiments, the primary synchronization sequence (PSS) does not need to be differentiated between the networks, while the secondary synchronization sequence (SSS) can be isolated between the networks by the same cover code as all the reference signals are. This is explained below by way of illustrative and non-limiting examples.

PSS sequences can be Zadoff-Chu sequences. Multiplying Zadoff-Chu sequences with a cover code may destroy their correlation properties. According to certain embodiments, PSS can be left to its legacy form without multiplying by the cover code. Leaving PSS sequences as they are in the legacy will result that UE may possibly detect many PSS-sequences. UE may possibly even detect the same PSS sequence from multiple cells. Such a situation may arise, for example, when two LAA networks have chosen the same PCI; or two LAA networks each have decided a PCI, whose PSS happens to be the same sequence. This situation appears in the legacy LTE/LTEA as well, because for the set of PCIs many PCIs have the same PSS and they are separated by their SSS. The device may know from the fixed timing difference between the PSS sequences transmitted from the same transmission point, which PSS transmissions are from the same transmission point and which are from different transmission points.

Based on the found PSS, UE knows how to place the SSS search window and may start detecting SSS sequences. As SSS is, additionally to each sequence selection, protected by the PSS dependent scrambling code multiplication, the robustness of SSS can be improved. See legacy 3GPP technical specification (TS) 36.211, which is incorporated herein by reference in its entirety. For LAA, however, the SSS isolation between different networks may not be provided by the legacy specification, and the SSS isolation may be provided according to certain embodiments of the invention by multiplying the scrambled SSS by yet an additional long cover code, which can differentiate LAA networks. This may be performed similarly to what is described above for the cover code scrambling of the reference signals, CRS, DRS, and the like.

SSS can be present in different forms in subframe 0 and subframe 5. The cover code can be a very long sequence, for example, extending over all symbols in 10 ms. Hence, the SSS halves in subframes 0 and 5 can get scrambled from two distinct pieces of the same cover code sequence. This can further protect SSS halves between different networks.

If the UE wrongly detects the PSS/SSS of another network (with a small probability of coincidence), the UE may still not be able to detect the reference signal, such as CRS, DRS, or the like, scrambled with the network specific LAA cover code. It may also happen in the legacy network (with small probability) that CRS detection is not successful. However, according to certain embodiments, the cover code avoids the use of wrong CRS altogether, in the unlicensed band. The frequency and timing correction can hence be done at least partly from the correct PSS/SSS and/or from the correct reference signals, while the channel estimation and data decoding can happen based on the reference signals. Thus, in certain embodiments no harm may be caused by a rare failing attempt.

If the (low) probability of UE detecting the PSS/SSS from the wrong transmission point is increased a little (compared to the legacy operation having even a lower probability of coincidence), that failure-case can be easily detected by the UE not being able to find the cover code scrambled reference signals at all.

In the first successful attempt, or any following successful attempt after any failed reference signal detection attempts, the UE can use the correct PSS/SSS, and the correct reference signals can then be found, this time with the known cover code sequence.

The cover code can be defined as a very long scrambling sequence. This sequence can be one per LAA network and can always start at known symbol phase. The sequence phasing may be simple to do, when all the reference signals and synchronization signals are generated in the same transmission point with the cover code. Hence, there may be no inaccuracy present in this code multiplication, between the codes, in the transmitter nor in the receiver.

If an additional scrambling sequence is used as the cover code for signal isolation in the LAA Scell carriers, the way that the network specific cover code is generated can be a matter of standard definition. The use of an additional cover code may add nearly no complexity in the UE side because multiplying by the cover code sequence before using the actual reference signals may be a simple task, as the cover code may be set to the same (signal) phase as the actual reference signal sequence, in the transmission point. Therefore, in certain embodiments no additional ambiguity of the reference signal sequence search is introduced because of the multiplication by a known cover code. The search of sequences, accurate timing detection, measurements and channel estimation using a reference signal may work as in legacy approaches, with or without the additional cover code.

Figure 3A:
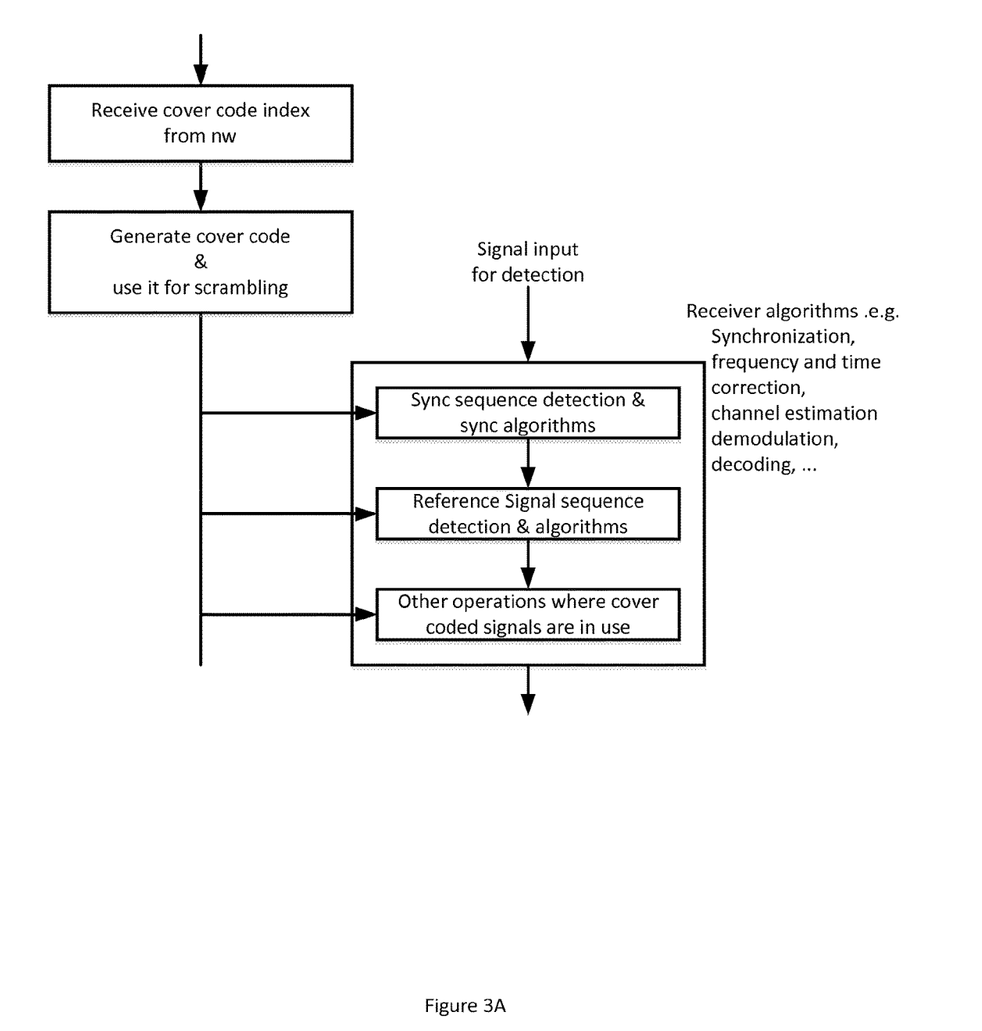
FIGS. 3A and 3B illustrate user equipment functionality according to certain embodiments.
Figure 3B:
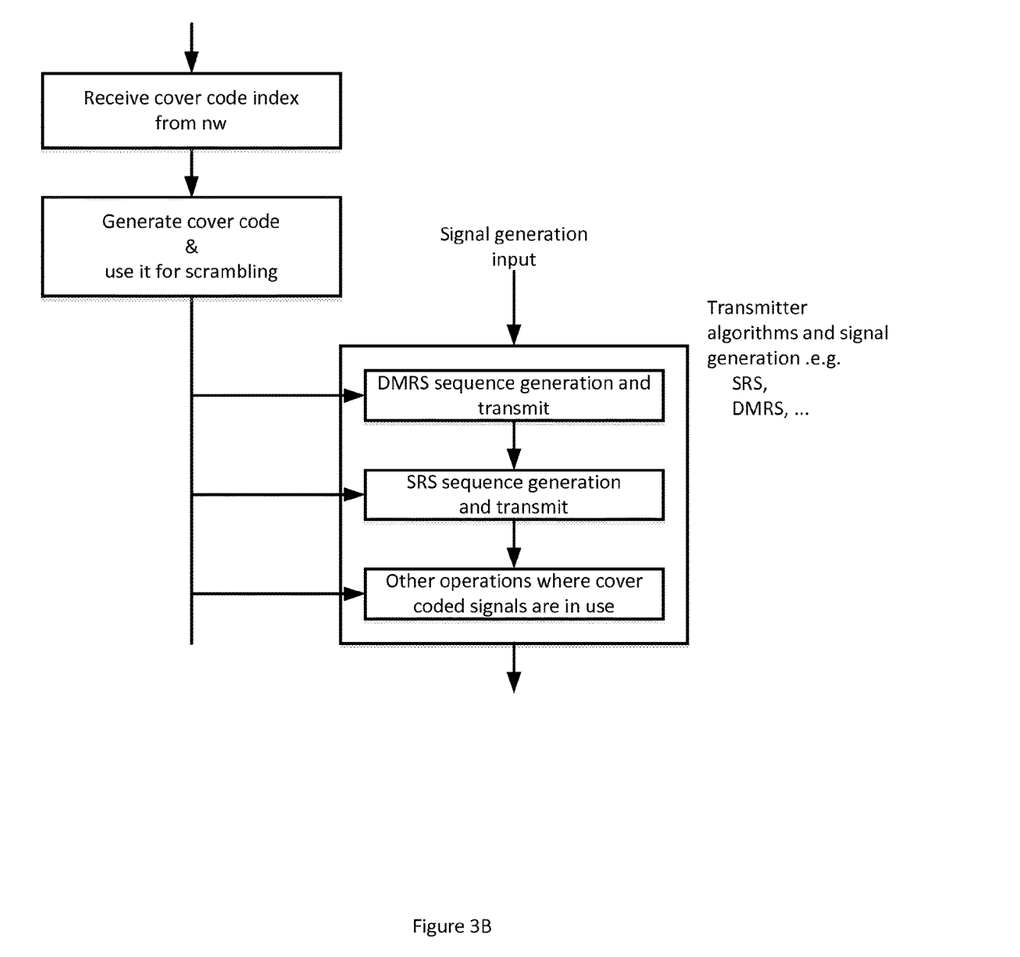

FIGS. 3A and 3B illustrate user equipment functionality according to certain embodiments. As shown in FIGS. 3A and 3B, a user equipment (UE) can receive a cover code index from a network (NW). The UE can use the cover code index to generate a cover code and can use the cover code for scrambling and/or for descrambling. Furthermore, as shown in FIG. 3A, the UE can use the cover code for sequence detection and in UE receiver processing. In another embodiment it may be sufficient that UE just decodes the primary PLMNID and knows at least the relationship of one of its fields to the cover code index. In any of the embodiments, for example, the receiver can receive signal input for detection. The receiver can then use the cover code in connection with synchronization sequence detection and synchronization algorithms. Likewise, the receiver can use the cover code for reference signal sequence detection and related algorithms. Furthermore, the receiver can use the cover code for other operations where cover coded signals are in use.

Additionally, as shown in FIG. 3B, the UE can use the cover code for sequence generation and transmission. The transmitter can receive signal generation input for transmission. The transmitter can then use the cover code in connection with DMRS sequence generation and transmission. Likewise, the transmitter can use the cover code for SRS sequence generation and transmission. The transmitter can additionally use the cover code in other operations where cover coded signals are in use.

According to certain embodiments, the non-orthogonal cover code can be created as a pseudo-random sequence (or a pseudo-noise sequence). A pseudo-random sequence can be generated, for example, from the maximum-length sequences (m-sequence). In 3GPP TS 36.211, section 7.2, pseudo-random sequences are generated from two length-31 Gold sequences. For certain embodiments, this formula or a similar formula could be used. Different initializations can be applied, and such initializations may according to certain embodiments depend on the network specific input. Also other ways of generating pseudo-random sequences can be used in connection with certain embodiments. As well in such a case, network specific initializations can be applied.

Apart from the system information transmission in the Scell, there may be value in having some signals on the LAA Scell carrier, which allow the UE to recognize that the component carrier belongs to the same LAA network as the Pcell which UE is receiving on the licensed carrier. On licensed band such identification may be done by the physical cell identity (PCI). In the unlicensed band there is no guarantee of the unity of the PCI, because PCI signals can be specific to the LTE system. Hence, it is possible that multiple networks operate on the same spectrum in the same area.

In case the cover code were not in use, it is also possible that two close by eNBs of two different networks may happen to select the same PCI, because there is no PCI coordination across different networks. Thus, for a LAA component carrier, it may be valuable to provide a PCI collision avoidance mechanism between different LAA networks. Furthermore, it may be needed to include to the Scell component carrier some network identification information or network identification signal. Additionally, or alternatively, it may be valuable to provide a mechanism to sufficiently isolate the signals of the different networks, even if their PCIs happen to be the same.

Because the Scell measurements may also be needed at times when there are no transport blocks received on the Scell, so including some network identification information or a network identification signal may be required; however. it may require that such network identification signal be frequently present e.g. to avoid the measurement confusions. In addition, this identification may need to be frequently decoded by the UE, and the UE may already need to decode it for the measurement purposes, which adds complexity and may not be practical, because typically measurements on a carrier are expected to be done without (or before) decoding information on that carrier. Because the PCI of a transmission point may change at transmission point power-up, and because there may be changes in how signals propagate from the transmission points to the UE as well as how signals are received at each UE receiver in its current location, it may be a challenge to avoid the situation that PCI detection mistakes at the UE receiver would never happen. Therefore, applying a cover code appears to be superior among these embodiments.

Certain embodiments may communicate using information elements of LAA RRC connection reconfiguration signaling or System Information. These RRC signaling or System Information signaling may be carried in the licensed band or in the unlicensed band, according to embodiments of the invention. Furthermore, certain embodiments can apply a cover code on reference signals being transmitted by the network in the LAA Scell component carriers.

There can be various implementations of certain embodiments. For example, certain embodiments can be implemented in LAA capable eNBs, in LAA transmission points, in LAA remote heads or in access points or home nodes. Certain embodiments can also be implemented to LAA capable UE(s).

Certain embodiments may provide various benefits and/or advantages. For example, certain embodiments may provide isolation of two LAA networks operating on an un-licensed band.

There may be other means of avoiding PCI collisions, they however are much more complicated and require longer latency of detection compared to the protection by a cover code. PCI collisions, if they are detected by the eNB, may be avoided, but that requires long correlation for the detection of possibly colliding sequences. Further, those detections would need to be repeatedly (or continuously) followed and needed to be done again and again, as another network eNB may appear colliding suddenly as if it wakes-up from power down and picks the same PCI (without noticing that it is in use by the other network). Also, in case of collision, the impact is quite dramatic because the eNB if wanting to change its PCI, need to re-initialize the whole Scell transmission. In this case all UEs served on that component carrier will be dropped from this Scell reception. Also, as said, the detection of PCI-in-use will require processing power from the eNB and will cause latency for the beginning (and at every new beginning) of the Scell transmissions. This latency is not short, because PCI collision detection needs considerable time to be able to detect the PCIs-in-use in that spectrum. Another issue is that eNB may not be able to detect the PCI collision but it is only detectable by a UE which receives correlating signals from two networks. In this case, UE feedback is needed to the serving eNB to solve the problem. The solution may be to deactivate this Scell for this UE and change the component Scell carrier for example. However, if many UEs detected the problem it gets more laborious and may lead to a situation where the Scell carrier is not usable at all, unless the eNB changes its PCI. Then the consequence is as before.

The on/off behaviour expected for LAA Scells may complicate the detection of PCI collisions as they may appear discrete in time. Also, when/if a PCI needs to be changed it may cause a consequent effect that the changed PCI collides with some other cell, which it did not collide before. (A smart PCI change should be able to avoid this consequence, at least typically). If more than two networks (Scells) are present in the area, the collision probability of PCIs gets larger, if certain embodiments are not in use. All networks use the same set of PCIs and any collision between any networks and any nodes need to be avoided. Also, if a cell is moving (which cannot be fully excluded), the PCI collision of a moving cell can get more likely and more difficult to avoid than a stationary cell.

The example embodiments for using a cover code will avoid all the problems mentioned above for a PCI change mechanism. When the cover code is used it provides full protection to any other network, because the cover code is network specific and it keeps the correlation between the (very long) cover code sequences in different networks sufficiently low. Further, the use of cover code allows avoiding the PCI change.

Figure 4:
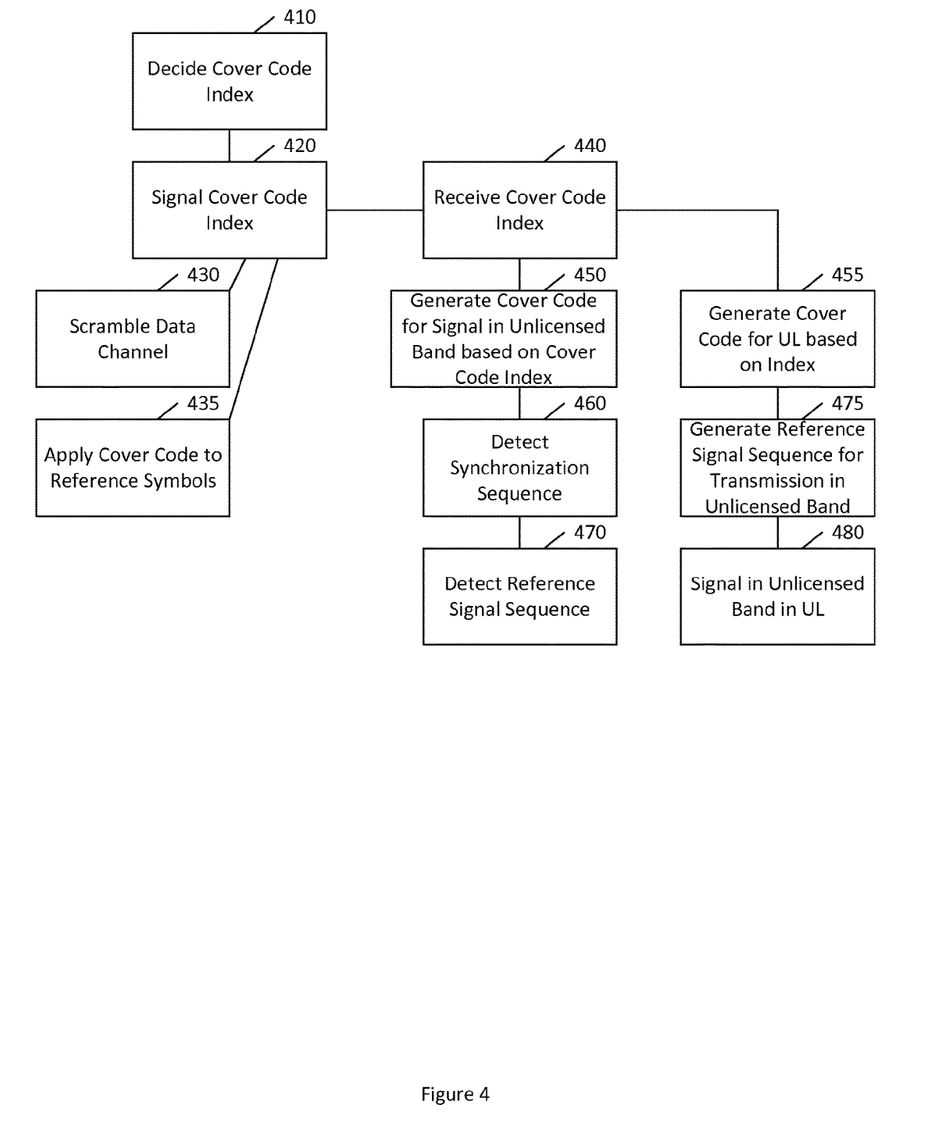
FIG. 4 illustrates a method according to certain embodiments.

FIG. 4 illustrates a method according to certain embodiments. As shown in FIG. 4, a method can include, at 410, deciding a cover code index. The method can also include, at 420, signaling the cover code index to a user equipment. The cover code index can correspond to a non-orthogonal cover code that is created in a network-specific manner.

The non-orthogonal cover code can be created as a long scrambling sequence. The length of the scrambling sequence can be over all symbols over full bandwidth for a period of one frame.

The cover code can be created in the network in the network-specific manner. The cover code index can be created from a mobile network code of a public land mobile network identifier. Optionally, the cover code index can be created from the mobile network code in combination with a mobile country code.

The method can further include, at 430, scrambling, by the cover code, at least one data channel. This can be in addition to other uses of the cover code, such as applying the cover code to reference symbols at 435.

The above-described features at 410, 420, 430, and 435 can be performed by a network element such as, for example, an evolved node B, a licensed assisted access transmission point, or an access point.

The method can further include, at 440, receiving a cover code index, wherein the cover code index corresponds to a non-orthogonal cover code that is created in a network-specific manner. This can be the same index signaled at 420. The method can also include, at 450, generating the cover code based on the cover code index.

The method can further include, at 460, detecting a synchronization sequence using the cover code. The method can additionally include, at 470, detecting a reference signal sequence using the cover code.

The features at 450, 460, and 470 can correspond to downlink processing. Additionally, at 455, the method can include generating a cover code for UL based on the received index. The method can further include generating, at 475, a reference signal sequence for transmission in the unlicensed band. Furthermore, the method can include, at 480, signaling in an unlicensed band using the cover code in an uplink communication. Thus, the features at 455, 475, and 480 can be applied in an uplink processing path.

For the use in uplink, the cover code may be created separately from the downlink, and the corresponding timing phase can be different. The cover code index and the very long sequence itself can be the same for uplink as for the downlink.

The above-described features at 440, 450, 455, 460, 470, 475, and 480 can be performed by, for example, a user equipment. The user equipment can be any terminal device, including devices that do not necessarily typically have a human user on a regular basis, such as smart meters, sensors, and the like, as well as devices that typically do have human users, such as smart phones, personal digital assistants, personal computers, laptop computers, tablet computers, and so on.

Figure 5:
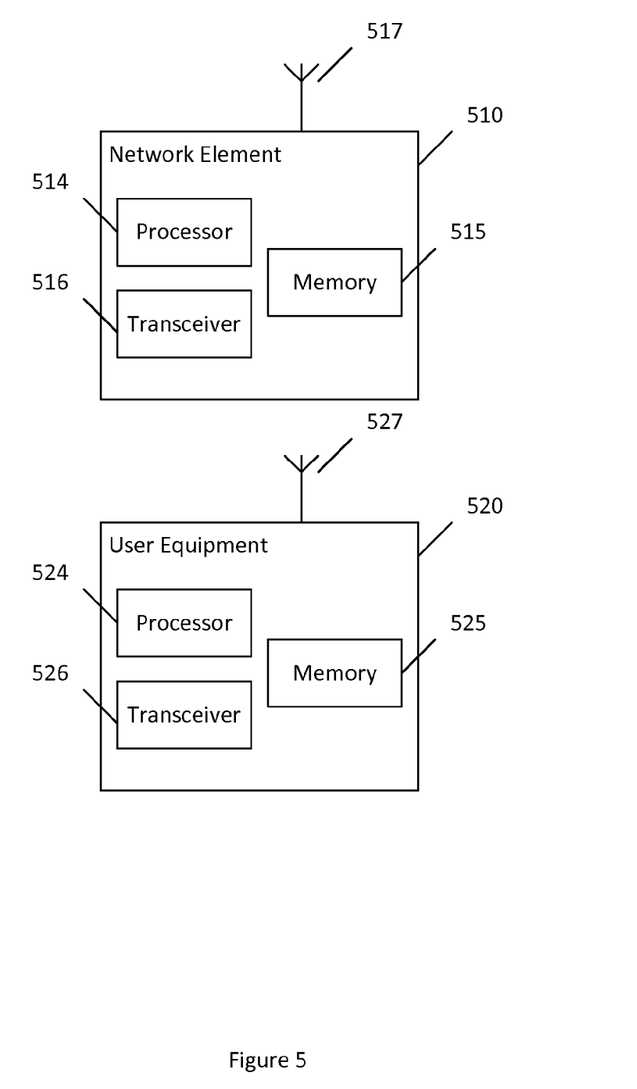
FIG. 5 illustrates a system according to certain embodiments.

FIG. 5 illustrates a system according to certain embodiments of the invention. It should be understood that each block of the flowchart of FIG. 4 may be implemented by various means or their combinations, such as hardware, software, firmware, one or more processors and/or circuitry. In one embodiment, a system may include several devices, such as, for example, network element 510 and user equipment (UE) or user device 520. The system may include more than one UE 520 and more than one network element 510, although only one of each is shown for the purposes of illustration. A network element can be an access point, a base station, an eNode B (eNB), or any other network element, such as a PCell base station SCell base station. Each of these devices may include at least one processor or control unit or module, respectively indicated as 514 and 524. At least one memory may be provided in each device, and indicated as 515 and 525, respectively. The memory may include computer program instructions or computer code contained therein. One or more transceiver 516 and 526 may be provided, and each device may also include an antenna, respectively illustrated as 517 and 527. Although only one antenna each is shown, many antennas and multiple antenna elements may be provided to each of the devices. Other configurations of these devices, for example, may be provided. For example, network element 510 and UE 520 may be additionally configured for wired communication, in addition to wireless communication, and in such a case antennas 517 and 527 may illustrate any form of communication hardware, without being limited to merely an antenna.

Transceivers 516 and 526 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 520 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. The user device or user equipment 520 may be a sensor or smart meter, or other device that may usually be configured for a single location.

In an exemplifying embodiment, an apparatus, such as a node or user device, may include means for carrying out embodiments described above in relation to FIGS. 1 through 4.

Processors 514 and 524 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or unit of at least one chip set (e.g., procedures, functions, and so on). Memories 515 and 525 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 510 and/or UE 520, to perform any of the processes described above (see, for example, FIGS. 1 through 4). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 5 illustrates a system including a network element 510 and a UE 520, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Figure 6:
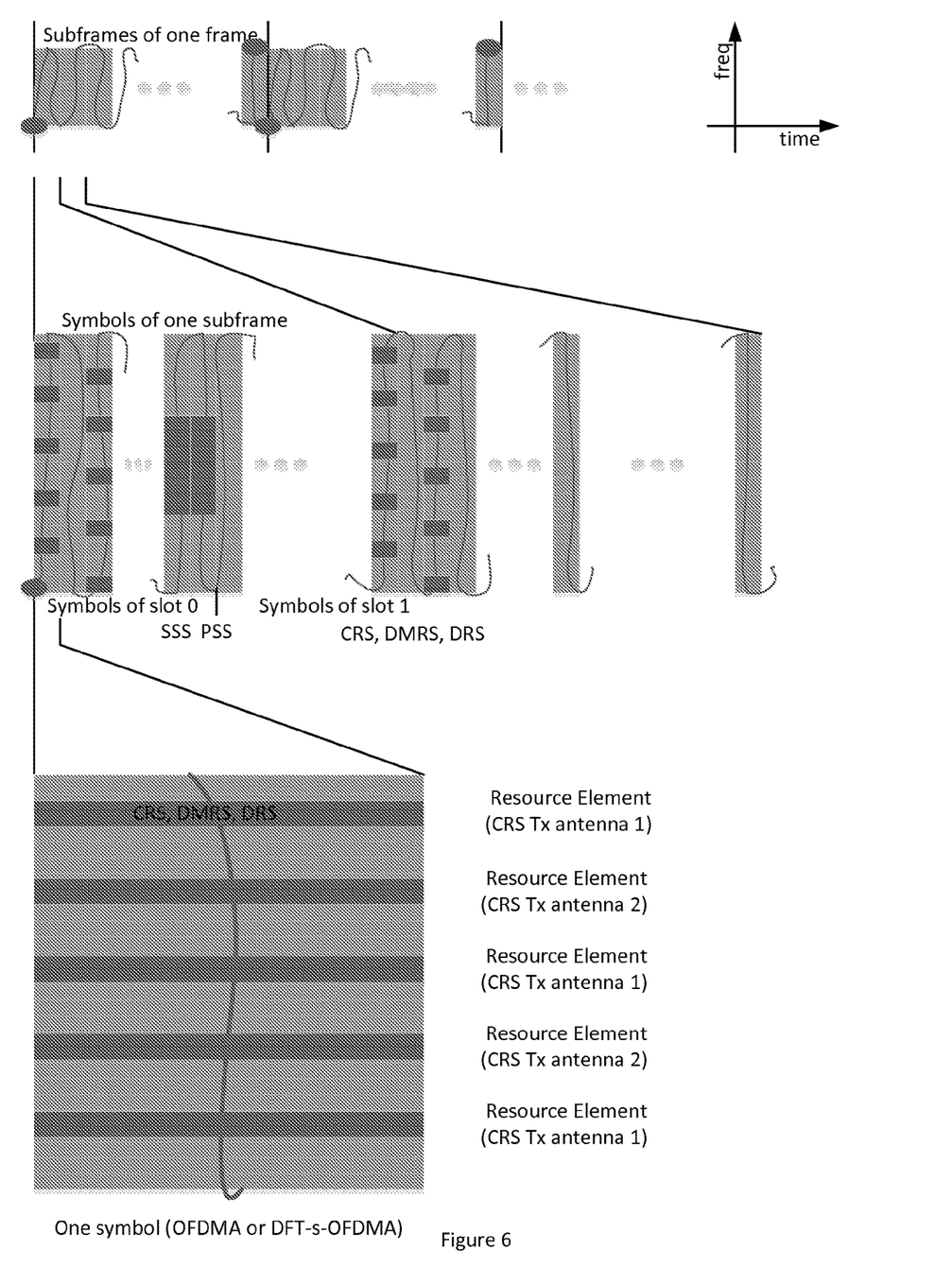
FIG. 6 illustrates cover code sequence generation according to certain embodiments.

There may be various ways to generate the code sequence used in connection with certain embodiments. FIG. 6 illustrates cover code sequence generation according to certain embodiments. More particularly, FIG. 6 shows how the cover code sequence can be generated to multiply every resource element running over all elements of one symbol, over all symbols of a subframe and over all subframes of a frame.

However, all the code samples may not be in use, but only those samples of the sequence that hit a resource element position where a signal to be multiplied is transmitted. Thus, for example, they may be in use in resource elements for the reference signal symbols (for example, in every xth resource element in some selected orthogonal frequency division multiplexed (OFDM) symbols) and for the synchronization sequence (in every resource element in the central 6 physical resource blocks (PRBs) of some symbols in subframe 0 and subframe 5 in a frame).

The cover code index can run in the frequency domain, for example, over the bandwidth of 20 MHz, or any widest bandwidth of a component carrier. If the component carrier is narrower, for example 10 MHz, then only that 10 MHz part of the sequence samples may be in use. In case multiple component carriers (of for example 20 MHz) are in use, the cover code can be generated separately for each component carrier.

The cover code sequence samples can be complex numbers or real numbers, or they can be bits. If, in a resource element, the modulation constellation includes multiple bits and if the cover code sequence is a bit-sequence, then each and every bit (in the constellation) can be multiplied by the bits of the cover code sequence.

Figure 7:
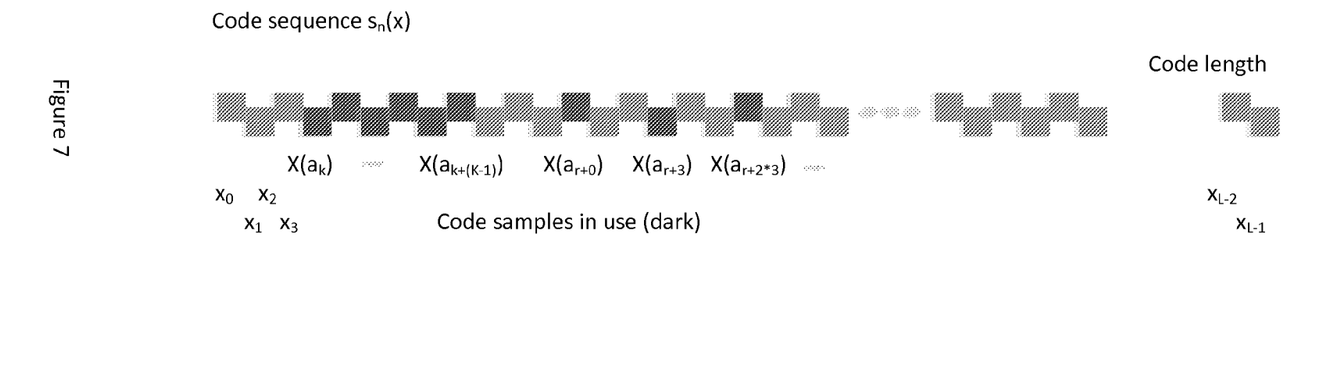
FIG. 7 illustrates generation of a long sequence according to certain embodiments.

FIG. 7 illustrates generation of a long sequence according to certain embodiments. As shown in FIG. 7, some selected samples or some selected segments of the sequence may be in use, depending on the reference signal and other signal configurations. The sequence sn(x) hence can be of length L, running from x(0) to x(L−1) in this example. There can be non-orthogonality between any cover code sequence of sn(x) relative to any other cover code sequence of sm(x), where m≠n. The set of sequences S can be large, where sn and sm can be example members of S (sn, sm $\in$ S). So, some LAA network can use cover code sequence sn(x) for its communication between the eNB/eNBs and its (their) served UE/UEs (in any or both link directions), while another LAA network can use cover code sequence sm(x) for its communication between the eN/eNBs and its (their) served UE/UEs (in any or both link direction).

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

I claim:

1. A method, comprising:
   deciding a cover code index; and
   signaling the cover code index to a user equipment,
   wherein the cover code index corresponds to a non-orthogonal cover code that is created in a network-specific manner, and
   wherein the cover code index is created using a seed of a mobile network code of a public land mobile network identifier.

2. The method of claim 1, wherein the non-orthogonal cover code can be created as a long, pseudo-random scrambling sequence.

3. The method of claim 2, wherein a length of the scrambling sequence is over all symbols over full bandwidth for a period of one frame.

4. The method of claim 1, wherein the cover code is created in a network in the network-specific manner.

5. The method of claim 1, wherein the cover code index is created using a seed of a mobile network code in combination with a mobile country code.

6. The method of claim 1, further comprising:
   scrambling, by the cover code, at least one of a data channel, a control channel, and a set of symbols.

7. The method of claim 1, wherein the method is performed by a network element.

8. The method of claim 7, wherein the network element is an evolved node B, a licensed assisted access transmission point, a remote head, an access point, a home node, a hotspot transmitter, or a distributed transmitter.

9. An apparatus, comprising:
   at least one processor; and
   at least one memory including computer program code,
   wherein the at least one memory and the computer program code, with the at least one processor, cause the apparatus at least to perform
   deciding a cover code index; and
   signaling the cover code index to a user equipment,
   wherein the cover code index corresponds to a non-orthogonal cover code that is created in a network-specific manner, and
   wherein the cover code index is created using a seed of a mobile network code of a public land mobile network identifier.

10. The apparatus of claim 9, wherein the non-orthogonal cover code can be created as a long, pseudo-random scrambling sequence.

11. The apparatus of claim 10, wherein a length of the scrambling sequence is over all symbols over full bandwidth for a period of one frame.

12. The apparatus of claim 9, wherein the cover code is created in a network in the network-specific manner.

13. The apparatus of claim 9, wherein the cover code index is created using a seed of a mobile network code in combination with a mobile country code.

14. The apparatus of claim 9, wherein the at least one memory and the computer program code are configured to, with the at least one processor, cause the apparatus further to perform:
   scrambling, by the cover code, at least one of a data channel, a control channel, and a set of symbols.

15. An apparatus, comprising:
   at least one processor; and
   at least one memory including computer program code,
   wherein the at least one memory and the computer program code, with the at least one processor, cause the apparatus at least to perform
   receiving a cover code index, wherein the cover code index corresponds to a non-orthogonal cover code that is created in a network-specific manner;
   generating the non-orthogonal cover code based on the cover code index; and
   signaling in an unlicensed band using the non-orthogonal cover code in an uplink communication.

16. The apparatus of claim 15, wherein the at least one memory and the computer program code are configured to, with the at least one processor, cause the apparatus further to perform:
   detecting at least one of a synchronization sequence and a reference signal sequence using the non-orthogonal cover code.

17. The apparatus of claim 15, wherein the apparatus comprises a user equipment.

* * * * *